(12) United States Patent
Lee (10) Patent No.: US 11,704,432 B2
(45) Date of Patent: Jul. 18, 2023

(54) SYSTEM ON CHIP, METHOD AND APPARATUS FOR PROTECTING INFORMATION USING THE SAME

(71) Applicant: LG ELECTRONICS INC., Seoul (KR)

(72) Inventor: Jae Yong Lee, Gwacheon-si (KR)

(73) Assignee: LG ELECTRONICS INC., Seoul (KR)

( * ) Notice: Subject to any disclaimer, the term of this patent is extended or adjusted under 35 U.S.C. 154(b) by 667 days.

(21) Appl. No.: 16/560,415

(22) Filed: Sep. 4, 2019

(65) Prior Publication Data

US 2020/0004984 A1    Jan. 2, 2020

(30) Foreign Application Priority Data

Aug. 9, 2019 (KR) .......................... 10-2019-0097406

(51) Int. Cl.
*G06F 21/62* (2013.01)
*G06N 20/00* (2019.01)
*G06F 12/14* (2006.01)

(52) U.S. Cl.
CPC .......... *G06F 21/6245* (2013.01); *G06F 12/14* (2013.01); *G06N 20/00* (2019.01)

(58) Field of Classification Search
CPC ...... G06F 21/6245; G06F 12/14; G06N 20/00
See application file for complete search history.

(56) References Cited

U.S. PATENT DOCUMENTS

| 9,361,246 | B2 * | 6/2016 | Park | G06F 12/145 |
| 10,303,953 | B2 | 5/2019 | Varerkar et al. | |
| 2006/0129819 | A1 * | 6/2006 | Hirota | G11C 16/22 |
| | | | | 713/172 |
| 2010/0174860 | A1 * | 7/2010 | Kim | G06F 12/0246 |
| | | | | 711/E12.001 |
| 2011/0150327 | A1 | 6/2011 | Yoo et al. | |
| 2013/0036312 | A1 * | 2/2013 | Anquet | G06F 21/78 |
| | | | | 713/189 |
| 2015/0104012 | A1 * | 4/2015 | Holman | H04W 12/65 |
| | | | | 380/243 |
| 2017/0185345 | A1 * | 6/2017 | Lim | G06F 3/0622 |
| 2018/0121125 | A1 * | 5/2018 | Zeng | G06F 3/0659 |
| 2020/0379923 | A1 * | 12/2020 | Lidman | G06N 3/08 |

FOREIGN PATENT DOCUMENTS

| JP | 4903366 B2 * | 3/2012 |
| KR | 10-2012-0035299 A | 4/2012 |
| KR | 10-2014-0053595 A | 5/2014 |
| KR | 10-1802500 B1 | 11/2017 |

\* cited by examiner

*Primary Examiner* — Matthew T Henning
(74) *Attorney, Agent, or Firm* — Birch, Stewart, Kolasch & Birch, LLP

(57) ABSTRACT

An apparatus and method of protecting information by using a system on a chip (SoC) are discussed. The apparatus includes a SoC memory which is disposed in a predetermined SoC and includes a first region accessible only by a unit having an access right, and a hardware (HW) filter configured to monitor at least one unit attempting to access the SoC memory. When a unit without an access right attempts to access the first region, the HW filter can block access of the unit without the access right.

6 Claims, 9 Drawing Sheets

SYSTEM ON CHIP, METHOD AND APPARATUS FOR PROTECTING INFORMATION USING THE SAME

CROSS-REFERENCE TO RELATED APPLICATION

This present application claims benefit of priority to Korean Patent Application No. 10-2019-0097406, entitled "SYSTEM ON CHIP, METHOD AND APPARATUS FOR PROTECTING INFORMATION USING THE SAME," filed on Aug. 9, 2019, in the Korean Intellectual Property Office, the entire disclosure of which is incorporated herein by reference.

BACKGROUND

1. Technical Field

The present disclosure relates to a system on a chip (SoC) and a method and apparatus for protecting information using the same, and more particularly, to a system on a chip for setting access rights of an internal memory and a method and apparatus for protecting privacy information by using the SoC.

2. Description of Related Art

With the wide use of cameras, various conveniences are being provided to users, for example, through cameras provided in smartphones, black boxes, CCTV, and head mounted displays (HMD). In order to maximize user convenience, there is a need for a method of accurately recognizing an object within a photographing range of a camera.

Accordingly, a device disclosed in related art 1 photographs a person with a camera and tracks a moving person using a plurality of tracking modules, thereby increasing the accuracy of object recognition.

However, since the device disclosed in related art 1 stores the recognized object without a special information protection mechanism when storing the recognized object, the device has difficulty in protecting information.

A device disclosed in related art 2 detects an area requiring information protection in an image and encrypts the detected area by masking the detected area, and when using the photographed image, the device unmasks and decrypts the masked area.

However, since the device disclosed in related art 2 encrypts and decrypts the photographed image by a software process such as masking or unmasking, it is vulnerable to an external attack such as hacking.

United States Patent Registration No. U.S. Ser. No. 10/303,953B (registered on May 28, 2019)

United States Patent Application Publication No. US20110150327A (published on 2011 Jun. 23)

SUMMARY OF THE INVENTION

An aspect of the present disclosure is to provide an information protection apparatus and method capable of storing privacy information requiring information protection in a memory area which is difficult to access by software.

Another aspect of the present disclosure is to provide an information protection apparatus and method for monitoring whether privacy information is included in image information which is inputted in real time, through vision recognition and neural network calculation.

Still another aspect of the present disclosure is to provide an information protection apparatus and method capable of providing safely stored privacy information only to a unit having an access right.

Aspects of the present disclosure are not limited to the above-mentioned aspects, and other technical aspects not mentioned above will be clearly understood by those skilled in the art from the following description.

An information protection apparatus according to an embodiment of the present disclosure may manage an access restricted area of a system on a chip (SoC) memory by using HW(hardware) filter hardware.

The information protection apparatus may include a system on a chip (SoC) memory which is disposed in a predetermined SoC and includes a first region accessible only by a unit having an access right, and a HW filter configured to monitor at least one unit attempting to access the SoC memory and, when a unit without an access right attempts to access the first region, block access of the unit without an access right.

The apparatus may further include a processor configured to store, in a filter storage of the HW filter, unit specific information of the unit having an access right to the first region, and the HW filter may determine a unit that has access to the first region based on the unit specific information stored in the filter storage.

Herein, the HW filter may be disposed on a system bus between at least one unit attempting a read or write operation in the SoC memory, and the SoC memory.

Herein, when a predetermined unit attempts to access a second region of the SoC memory without access restriction, the HW filter may allow an operation of the predetermined unit.

Herein, when privacy information is included in inputted content information, the processor may be configured to store the content information in the first region of the SoC memory, and when privacy information is not included in the inputted content information, the processor may be configured to store the content information in the second region of the SoC memory.

Herein, when the inputted content information includes image information, the apparatus may further include an object recognizer configured to recognize an object from the image information, and when privacy information is included in the image information or the recognized object, the processor may be configured to store the content information in the first region.

Herein, the object recognizer may include a vision information extractor configured to extract feature information from the image information or the recognized object based on vision recognition, and a neural network calculator configured to determine whether the image information or the recognized object includes the privacy information, by using the extracted feature information as an input, based on a previously stored learning model.

Herein, when the unit without an access right requests predetermined content information stored in the first region, the processor may be configured to determine whether the requested content information includes privacy information, and provide, to the unit without an access right, information on whether the privacy information is included, based on information on the determination.

Herein, when content information included in the first region is transmitted to an outside of the apparatus or the SoC, the apparatus may further include a security enhancement module configured to encrypt content information to be transmitted.

A system on a chip (SoC) according to another embodiment of the present disclosure may include: a system on a chip (SoC) memory including a first region accessible only by a unit having an access right, and a second region without access restriction; a HW filter configured to monitor at least one unit attempting to access the SoC memory and, when a unit without an access right attempts to access the first region, block access of the unit without an access right; and an SoC processor configured to store, in a filter storage of the HW filter, unit specific information of the unit having an access right to the first region.

Herein, when privacy information is included in inputted content information, the SoC processor may be configured to store the content information in the first region of the SoC memory, and when privacy information is not included in the inputted content information, the SoC processor may be configured to store the content information in the second region of the SoC memory.

Herein, when the inputted content information includes image information, the SoC may further include an object recognizer configured to recognize an object from the image information, and when privacy information is included in the image information or the recognized object, the SoC processor may be configured to store the content information in the first region.

Herein, the object recognizer may include: a vision information extractor configured to extract feature information from the image information or the recognized object based on vision recognition; and a neural network calculator configured to determine whether the image information or the recognized object includes the privacy information, by using the extracted feature information as an input, based on a previously stored learning model.

A method of protecting information by using a system on a chip (SoC) according to still another embodiment of the present disclosure may include: allocating, to an SoC memory, a first region accessible by a unit having an access right and a second region without access restriction; storing, in a HW filter, unit specific information of a unit having an access right to the first region; monitoring, by the HW filter, at least one unit attempting to access the SoC memory; and when a unit without an access right attempts to access the first region, blocking access of the unit without an access right.

Herein, the method may further include: when privacy information is included in inputted content information, storing the content information in the first region; and when privacy information is not included in the inputted content information, storing the content information in the second region.

Herein, the method may further include: when the inputted content information includes image information, recognizing an object from the image information; and when privacy information is included in the image information or the recognized object, storing the content information in the first region.

Herein, the recognizing of the object includes: extracting feature information from the image information or the recognized object based on vision recognition; and determining whether the image information or the recognized object includes the privacy information, by using the extracted feature information as an input, based on a previously stored learning model.

Herein, after the blocking of the access of the unit without an access right, the method may further include: when the unit without an access right requests predetermined content information stored in the first region, determining whether the requested content information includes privacy information; and providing, to the unit without an access right, information on whether the privacy information is included, based on information on the determination.

Herein, the method may further include: when content information included in the first region is transmitted to an outside of the SoC, encrypting content information to be transmitted.

Embodiments of present disclosure are not limited to the above-mentioned embodiments, and other embodiments not mentioned above will be clearly understood by those skilled in the art from the following description.

According to various embodiments of the present disclosure, the following effects may be derived.

First, information security can be improved by storing privacy information requiring information protection in a memory area that is difficult to access by software.

Secondly, by providing securely stored privacy information only to units with access rights, information security can be improved and user confidence in device usage can be improved.

Third, by monitoring whether the privacy information is included in image information inputted in real time through vision recognition and neural network calculation, recognition of the object may be improved.

Fourth, the information protection apparatus described above has market competitiveness since it may not be in violation of personal information regulation laws, such as the General Data Protection Regulation (GDPR) in Europe and the California Consumer Privacy Act (CCPA) in the United States.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Since artificial intelligence and extended reality technologies may be applied to various embodiments of the present disclosure, the following is an overview of artificial intelligence and extended reality.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Next, Extended Reality (XR) collectively refers to Virtual Reality (VR), Augmented Reality (AR), and Mixed Reality (MR). VR technology provides real world objects or backgrounds only in CG images, AR technology provides virtual CG images on real objects images, and MR technology mixes and combines virtual objects in the real world.

MR technology is similar to AR technology in that it shows both real and virtual objects. However, while virtual objects supplement physical objects in AR, virtual and physical objects co-exist as equivalents in MR.

XR technology may be applied to a head-mounted display (HMD), a head-up display (HUD), a mobile phone, a tablet PC, a laptop computer, a desktop computer, a TV, digital signage, and the like. A device employing XR technology may be referred to as an XR device.

Hereinafter, exemplary embodiments disclosed herein will be described in detail with reference to the accompanying drawings, and like reference numerals designate like elements, and redundant description thereof will be omitted. In addition, in describing the embodiments disclosed herein, when it is determined that the detailed description of the related known technology may obscure the gist of the embodiments disclosed herein, the detailed description thereof will be omitted, and the reference numerals may be referred to between the drawings.

Figure 1:
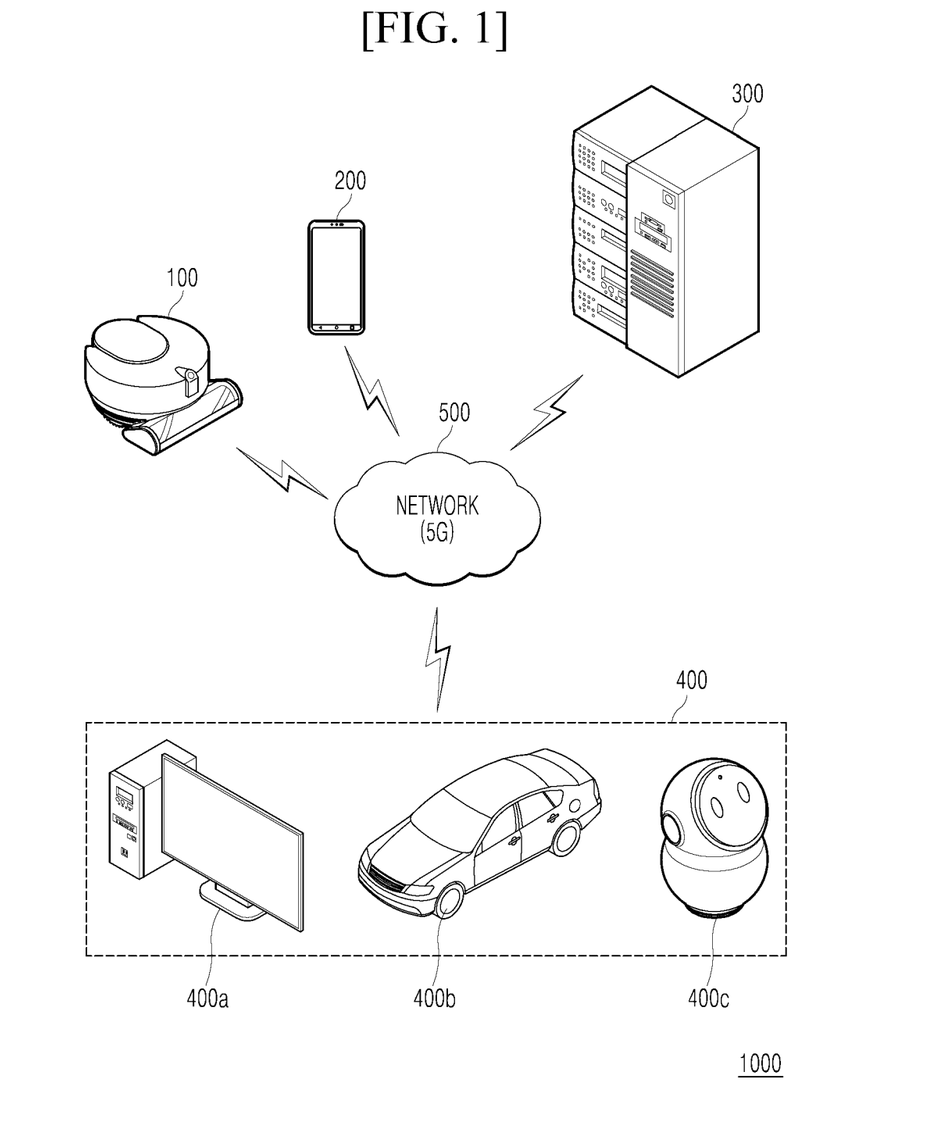
FIG. 1 is a schematic diagram showing an information protection cloud system based on a 5G network according to an embodiment of the present disclosure.

FIG. 1 schematically shows an information protection cloud system 1000 based on a 5G network according to an embodiment of the present disclosure.

The information protection cloud system 1000 may define various services that may be provided based on 5G, and may include an information protection apparatus 100, a mobile terminal 200, an information providing system 300, various devices 400, and a 5G network 500.

First, the information protection apparatus 100 may recognize various objects by using a camera (121 of FIG. 3), and may provide information related to the recognized objects to a user, the information providing system 300, the various devices 400, and the like.

The information protection apparatus 100 may include various devices including a camera. The information protection apparatus 100 may include mobile devices such as a robot cleaner, a mobile phone, a smartphone, a laptop computer, a digital broadcasting terminal, a personal digital assistant (PDA), a portable multimedia player (PMP), a navigation device, a slate PC, a tablet PC, an Ultrabook, a wearable device (such as a smartwatch), a glass type terminal (smart glass), or a head mounted display (HMD), and may also include fixed devices such as a digital TV, a desktop computer, or a digital signage. depending on the embodiment. In the present specification, the information protection apparatus 100 is assumed to be a robot cleaner 100.

The information protection apparatus 100 includes a System on a chip (hereinafter, referred to as a "SoC"), and the SoC is a technology-intensive semiconductor technology that implements a complex system having various functions as a single system. The SoC consists of a processor that controls the entire system and various IPs controlled by the processor. Here, IP refers to a circuit, logic, or a combination thereof that can be integrated in an SoC. In addition, a code may be stored in the circuit or the logic.

The information protection apparatus 100 may store content information requiring information protection in an SoC memory inside the SoC. The memory inside the SoC may include an access restricted area for which only a processor and a peripheral, for example, have access rights. In some embodiments, a running program (process or thread) having an access right may also access the access restricted area.

The mobile terminal 200 may request various information from the information protection apparatus 100 and receive various information from the information protection apparatus 100. The mobile terminal 200 may use a user authentication or a specific security algorithm in order to view the privacy information of the information protection apparatus 100, and the range of the privacy information to be disclosed may be set by the information protection apparatus 100.

The information providing system 300 may transmit various types of information to the information protection apparatus 100 and the mobile terminal 200 according to a request of the information protection apparatus 100 or the mobile terminal 200. The information providing system 300 may include a plurality of servers and may be implemented as a cloud type system.

Various devices 400 may include, for example, home appliances such as a computer 400a, a refrigerator, a washing machine, an air conditioner, and an AI speaker, an autonomous vehicle 400b, and a robot 400c, and may transmit and receive various information through the 5G network.

The various devices 400 may be wirelessly connected to, for example, the information protection apparatus 100, the mobile terminal 200, and the information providing system 300 through the 5G network 500 (for example, the Internet). In some embodiments, the various devices 400 may include, for example, a mobile phone, a smartphone, and a laptop computer.

The information protection apparatus 100 may communicate with, for example, the information providing system 300, and the various devices 400 through the network 500 using a communication module. The information protection apparatus 100 may request various information from the information providing system 300, and may receive various information calculated or retrieved from the information providing system 300. The calculation or search may include a calculation or search related to artificial intelligence.

Since the information protection apparatus 100, the mobile terminal 200, the information providing system 300, and the various devices 400 are all equipped with a 5G module, they are capable of transmitting and receiving data at speeds of 100 Mbps to 20 Gbps (or higher), transmitting large-capacity video files to various devices, and being driven at low power to thereby minimize power consumption. However, the transmission rate may be implemented differently according to the embodiment.

The 5G network 500 may provide a communication environment of devices in a wired or wireless manner, including a 5G mobile communication network, a local area network, and the Internet.

Figure 2:
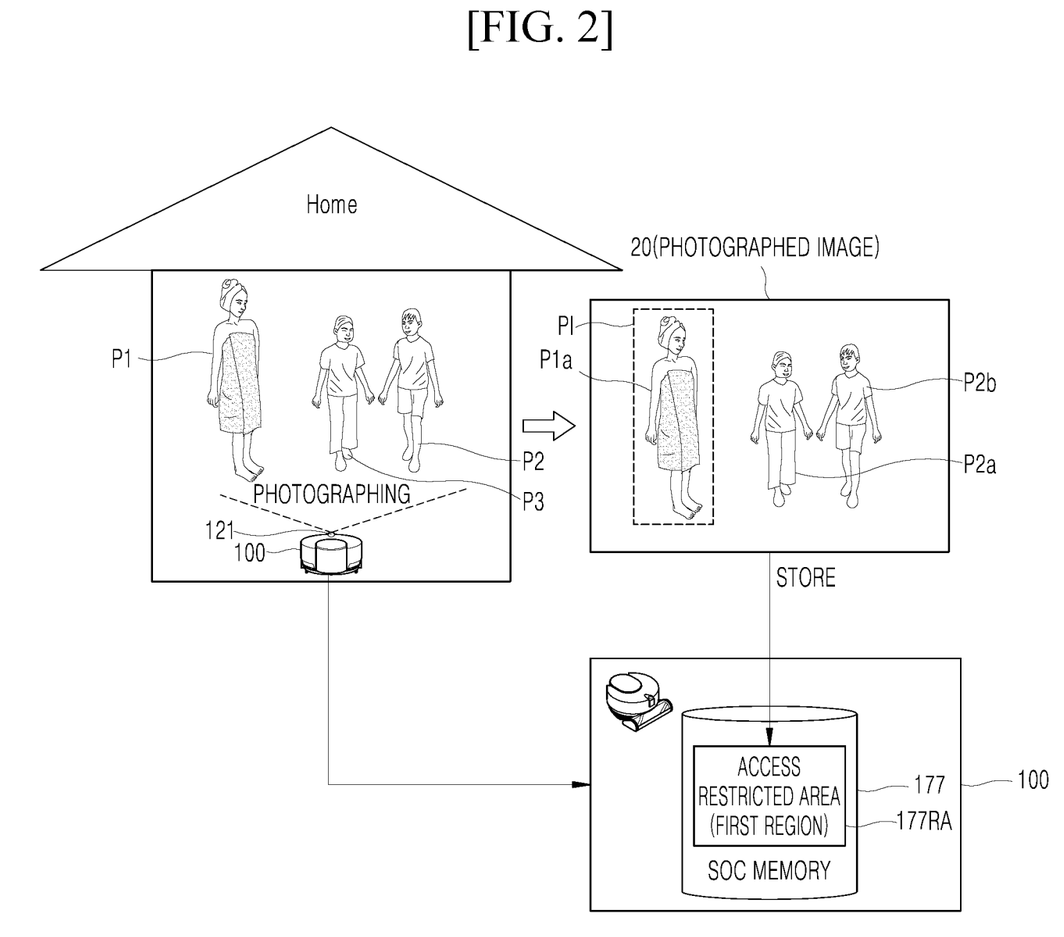
FIG. 2 is a diagram for schematically explaining the operation of an apparatus for protecting information according to an embodiment of the present disclosure.

Hereinafter, the driving of the information protection apparatus 100 according to an embodiment of the present disclosure will be described with reference to FIG. 2.

The information protection apparatus 100 may be disposed in a home, and may photograph the outside of the apparatus 100 through a camera 121. The information protection apparatus 100 may generate a photographed image 20 by photographing the inside of a home. In detail, the information protection apparatus 100 may photograph the inside of a home in real time, photograph people P1 to P3, and display images of the people P1a to P3a in the photographed image.

The information protection apparatus 100 may determine whether privacy information is included in the photographed image 20, and when the privacy information is included in the photographed image 20, information about the photographed image 20 may be stored in an access restricted area 177RA of the SoC memory 177 of the information protection apparatus 100. When privacy information is included in a specific object P1a, the information protection apparatus 100 may indicate that the object P1a is an object containing privacy information (PI), by using AR content.

The information protection apparatus 100 may set a unit (such as a processor and a peripheral) that may access the SoC memory 177 in the SoC in advance. Then, the SoC may restrict the access of the unit attempting to access the access restricted area 177RA by hardware. That is, the information protection apparatus 100 may block access to the SoC memory 177 by software using a system configured with a hardware-protected Secure Data Pipe Line.

Hereinafter, the configuration of the information protection apparatus 100 will be described with reference to the block diagram shown in FIG. 3.

Figure 3:
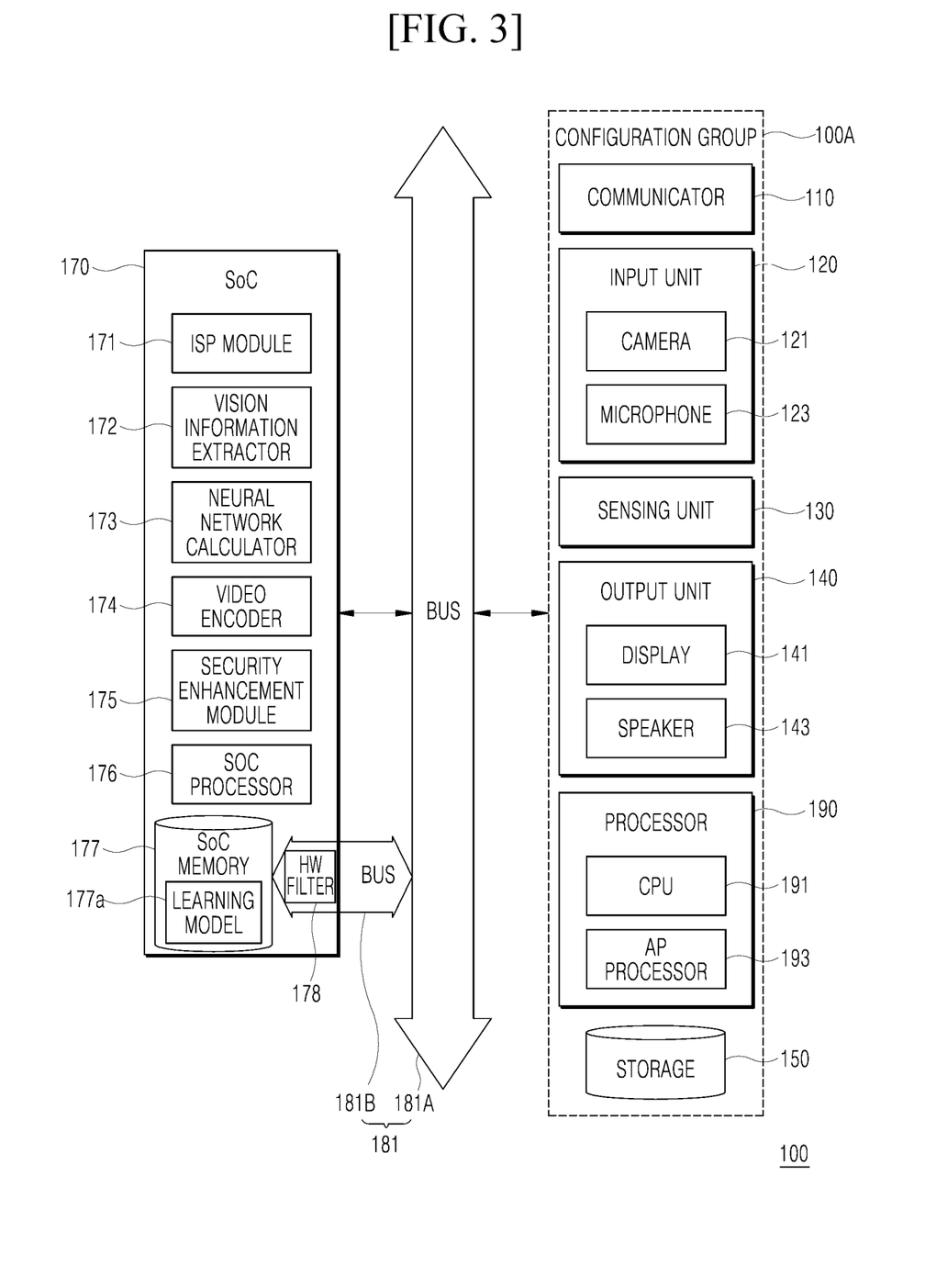
FIG. 3 is a block diagram showing a configuration of an apparatus for protecting information according to an embodiment of the present disclosure.

Referring to FIG. 3, the information protection apparatus 100 may include a configuration group 100A and an SoC 170. The configuration group 100A may include a communicator 110, an input unit 120, a sensing unit 130, an output unit 140, a storage 150, and a processor 190 as a basic configuration of the apparatus. The SoC 170 is a chip mounted in a predetermined area in the information protection apparatus 100. The SoC 170 may include, for example, an ISP module 171, a vision information extraction unit 172, a neural network calculator 173, a video encoder 174, a security enhancement module 175, an SoC processor 176, and an SoC memory 177. The components shown in FIG. 3 are not essential to implementing the information protection apparatus 100, and thus the information protection apparatus 100 described herein may have more or fewer components than those listed above.

First, the communicator 110 may transmit/receive data to/from various communication entities shown in FIG. 1 using wired or wireless communication technologies. For example, the communicator 110 may transmit and receive information such as sensor information, user input information, information about a learning model, and control signal information to and from the mobile terminal 200, the information providing system 300, and the various devices 400, but the transmitted information is not limited to these examples.

In this case, the communicator 110 may include a mobile communication module and a short range communication module. The mobile communication module may communicate through technologies such as Global System for Mobile communication (GSM), Code Division Multi Access (CDMA), Long Term Evolution (LTE), and 5G. The short-range communication module may communicate through technologies such as a wireless LAN (WLAN), Wireless-Fidelity (Wi-Fi), Bluetooth™, Radio Frequency Identification (RFID), Infrared Data Association (IrDA), ZigBee, and Near Field Communication (NFC).

The input unit 120 may include, for example, a camera 121 for inputting an image signal, a microphone 123 for receiving an audio signal, a user input unit for receiving information from a user. In this case, the signal obtained from the camera 121 or the microphone 123 may be referred to as sensing data or sensor information, by treating the camera 121 or the microphone 123 as a sensor.

The input unit 120 may obtain input data to be used when acquiring an output using training data and a learning model for model training. The input unit 120 may obtain raw input data, and in this case, the processor 190 may extract input features as a preprocessing operation on the input data.

The sensing unit 130 may obtain at least one of internal information of the information protection apparatus 100, surrounding environment information of the information protection apparatus 100, or user information, using various sensors.

Here, the sensor included in the sensing unit 130 may include, for example, a distance sensor, a proximity sensor, an illumination sensor, an acceleration sensor, a magnetic sensor, a gyro sensor, an inertial sensor, an RGB sensor, an infrared sensor, a fingerprint recognition sensor, a ultrasonic sensor, a light sensor (including the camera 121), a microphone 123, a lidar, and a radar.

The output unit 140 may generate an output related to visual, auditory, or tactile senses. The output unit 140 may include a display 141 for outputting visual information, a speaker 143 for outputting auditory information, and a haptic module for outputting tactile information.

The storage 150 may store data supporting various functions of the information protection apparatus 100. The storage 150 may store a plurality of application programs or applications that are driven by the information protection apparatus 100, data for operating the information protection apparatus 100, and instructions.

A power supply unit 160 receives power from an external power source and an internal power source under the control of the processor 190 to thereby supply power to each component of the information protection apparatus 100. The power supply unit 160 includes a battery, and the battery may be a built-in battery or a replaceable battery. The battery may be charged by a wired or wireless charging scheme, wherein the wireless charging scheme may include a magnetic induction scheme or a magnetic resonance scheme.

The processor 190 is a module that controls the components of the information protection apparatus 100. Here, the 'processor' may refer to a data processing device built in a hardware, which includes physically structured circuits in order to perform functions represented as a code or command present in a program. The processor 190 may include, for example, a central processing unit (CPU) 191 for controlling the entire system and an application processor 193 for driving a process related to an application. However, in some embodiments, the processor 190 may include a processing device such as a microprocessor, a processor core, a multiprocessor, an application-specific integrated circuit (ASIC), a field programmable gate array (FPGA), or the like, but the scope of the present disclosure is not limited thereto.

Next, the SoC 170 is an independent module mounted inside the information protection apparatus 100, and as described above, the SoC 170 may include, for example, an ISP module 171, a vision information extractor 172, a neural network calculator 173, a video encoder 174, a security enhancement module 175, an SoC processor 176, an SoC memory 177, and a HW (hardware) filter 178.

The Image Signal Processing (ISP) module 171 is a module that converts light into an electrical signal and may generate image signal information based on image sensing information inputted through the camera 121.

An object recognizer (not shown) is a module for recognizing an object from image information when inputted content information includes the image information, and may include a vision information extractor 172 and a neural network calculator 173. The object recognizer may be driven without calculation assistance of an external information providing system 300 in a secure environment (for example, an environment that is difficult for an external application program to access, or an environment using a tamper resistant memory).

First, the vision information extractor 172 may extract feature information from image information or a recognized object based on vision recognition. In detail, the vision information extractor 172 may extract information for selectively recognizing an object from an image photographed by the camera 121. In some embodiments, the vision information extractor 172 may receive image signal information from a camera 121 capable of recognizing depth information.

The neural network calculator 173 may perform a neural network calculation of determining whether image information or a recognized object contains privacy information based on a previously stored learning model, by using feature information extracted from the vision information extractor 172 as an input.

The neural network calculator 173 may determine whether privacy information is included in the image information. To this end, the neural network calculator 173 may calculate whether image information or a recognized object includes privacy information based on a learning model 177*a* stored in the SoC memory 177.

The learning model 177*a* may output information on whether privacy information is included in predetermined content information based on feature information of an object, for example, appearance information, dimension information (such as number, size, and volume), time information and place information of the object, information set as privacy information by the user, and movement information of the object.

The learning model is a pre-trained neural network model for determining whether image information includes privacy information based on image information or information on recognition of an object included in the image information. To this end, a label (output target answer) indicating whether privacy information on image contents and the contents is included.

The video encoder 174 is a component for encoding an image, in particular a video, and may be mainly used for transmitting an image through a communication network. When a video encoder is provided on a transmitting side, a video decoder is required on a receiving side.

The security enhancement module 175 may set unit specific information (such as a unique identifier) of the unit (processors, peripherals) in the HW filter 178 under the control of the SoC processor 176, and may run a security enhancement program. The security enhancement program can communicate with an external program. The security enhancement program may provide the external program with information of the access restricted area 177RA of the SoC memory 177 through user authentication or authentication of a key algorithm.

When an external unit desires to provide the information included in the access restricted area of the SoC memory 177 (177RA of FIG. 2), the security enhancement module 175 may store external unit specific information (such as an ID) in a register of the HW filter 178, which will be described below. The external unit may then access the information in the access restricted area 177RA. The HW filter 178 may determine whether to allow the external unit only the read operation, only the write operation, or both operations.

The security enhancement module 175 may receive information on the determination that the privacy information is likely to be included in the content information inputted in the neural network calculator 173, and may store the content information in the access restricted area 177RA of the SoC memory 177 under the control of the SoC processor 176.

The SoC processor 176 is a processor disposed inside the SoC. and is a module that controls the SoC as a whole.

The SoC memory 177 may be disposed inside the SoC, and may include a first region which only a unit having an access right may access and a second region without limitation in access.

The HW filter 178 may be disposed on a system bus 181B or a memory bus between a unit attempting a read or write operation on the SoC memory 177 and the SoC memory 177.

The HW filter 178 can block access to the SoC memory 177 by hardware, thereby simply defending against software hacking attempts.

The HW filter 178 may monitor the operation of all units accessing the SoC memory 177. The HW filter 178 may block access when a unit without an access right attempts to access the first region 177RA.

The SoC processor 176 may store unit specific information of a unit that may access the first region in a filter storage (such as a register) of the HW filter 178. The HW filter 178 may then determine a unit that may access the first region 177RA based on the unit specific information stored in the register. In an optional embodiment, the outside of the security enhancement module 175 may be allowed to access the first region 177RA, or information included in the first region 177RA may be provided to an external terminal.

In addition, when a predetermined unit attempts to access the second region (177G of FIG. 4) of the SoC memory 176 without access restriction, the HW filter 178 may allow the operation of the predetermined unit.

Here, the SoC processor 176 may change the region size based on the degree of use of the first region 177RA and the second region 177G. The SoC processor 176 may calculate proper size information of the first region and proper size information of the second region using information such as input time information, frequency information, and size information of the first and second regions as input data. In this case, the SoC processor 176 may be assisted by the neural network calculator 173.

The SoC memory 177 may store information necessary to perform an operation using artificial intelligence, machine learning, and an artificial neural network. The SoC memory 177 may store the above-described learning model 177a. The learning model 177a may be used to infer a result value with respect to new input data other than training data, and the inferred value may be used as a basis for judgment to perform an operation.

Here, the learning model 177a may include, for example, an object recognition model for accurately recognizing an object, a module for extracting privacy information included in an inputted object, and a model for allocating areas of the SoC memory 177.

The SoC processor 176 may include a learning processor for performing artificial intelligence computation or itself include a learning processor. The SoC processor 176 may train a model composed of an artificial neural network using learning data. Here, the trained artificial neural network may be referred to as a trained model. The trained model may be used to infer a result value with respect to new input data rather than learning data, and the inferred value may be used as a basis for a determination to perform an operation.

In this case, the SoC processor 176 may be implemented to perform artificial intelligence processing together with a learning processor of an artificial intelligence system (for example, the information providing system 300).

Figure 4:
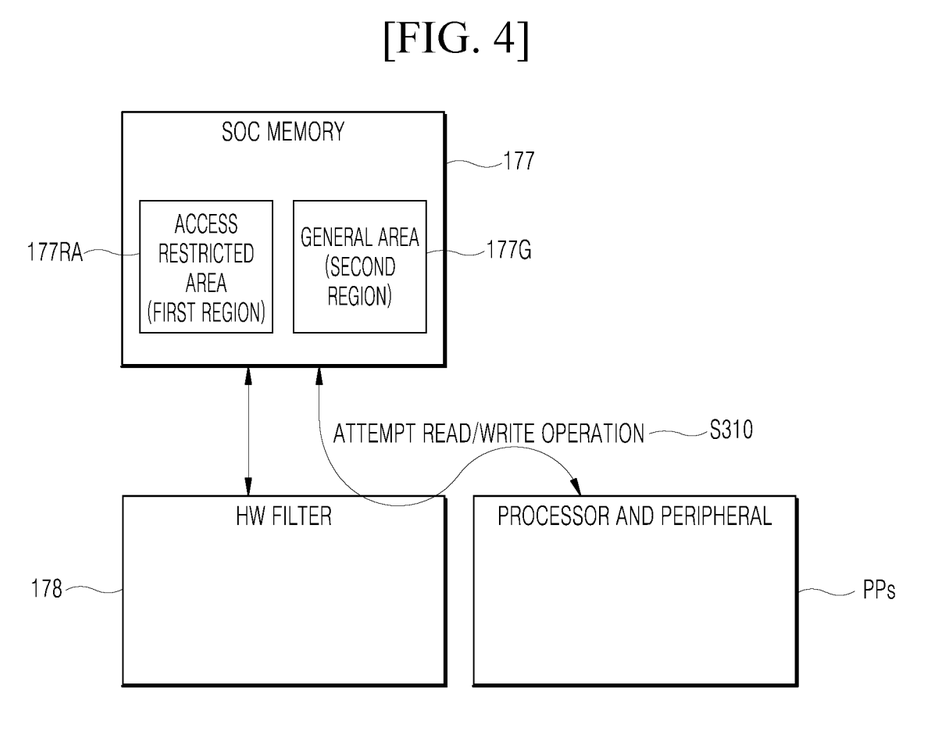
FIG. 4 is a diagram for describing a process of accessing a system on a chip (SoC) memory by an external unit according to an embodiment of the present disclosure.

FIG. 4 is a diagram for explaining a process of accessing the SoC memory 177 according to an embodiment of the present disclosure.

Referring to FIG. 4, the SoC memory 177 may include a first region 177RA, which is an access restricted area, and a general area (second region, 177G) without access restriction. The HW filter 178 may monitor the access of all units (processors and peripherals (PPs)) attempting to access the SoC memory 177. In some embodiments, the unit may include identification information of a specific program, in addition to hardware.

Figure 5:
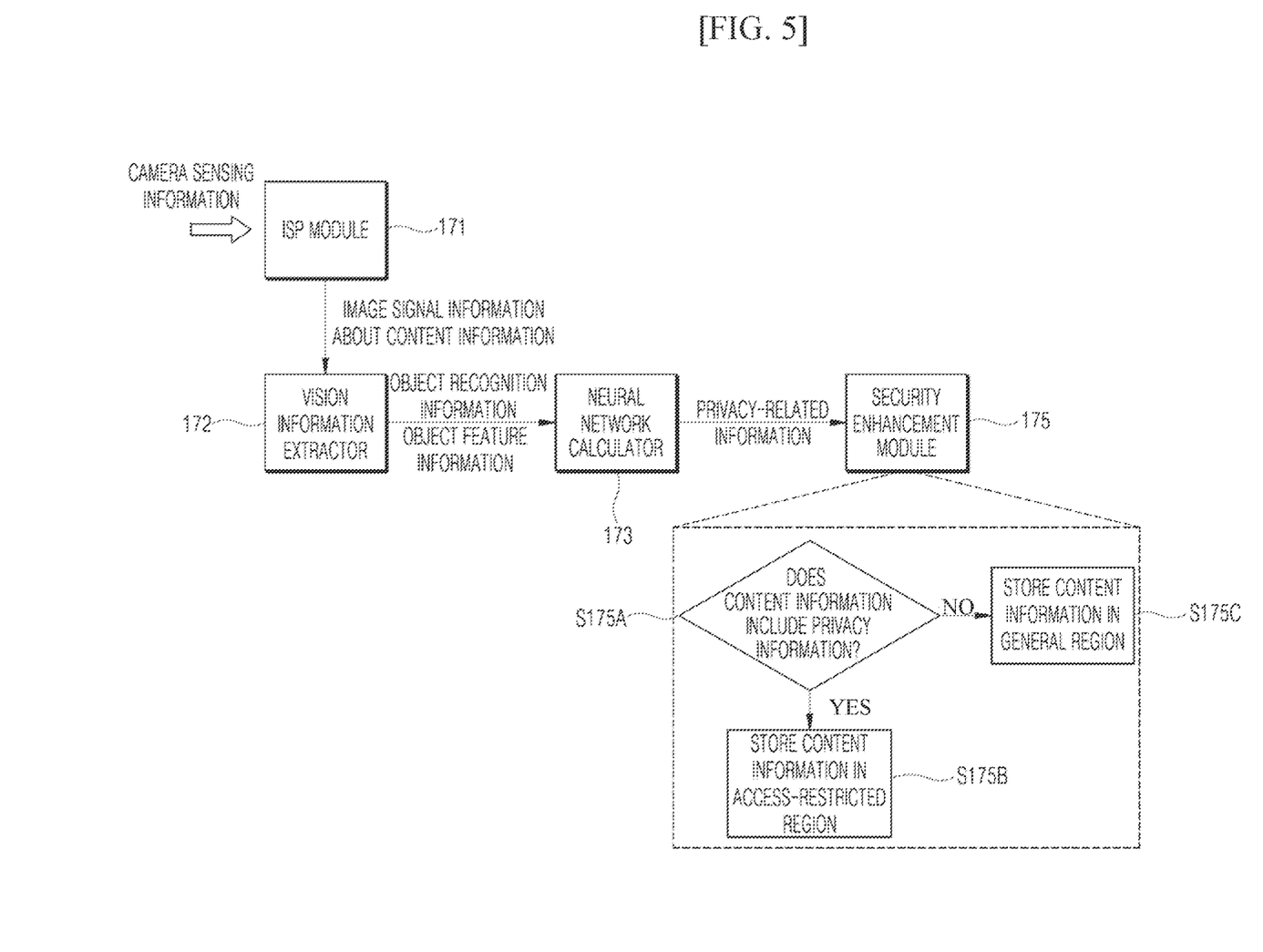
FIG. 5 is a block sequence diagram illustrating driving of an apparatus for protecting information according to an embodiment of the present disclosure.

FIG. 5 is a flowchart illustrating a method of driving the SoC 170 according to an embodiment of the present disclosure.

First, the ISP module 171 may receive camera sensing information, and may output image signal information about content information to the vision information extractor 172.

When the inputted content information includes image signal information, the vision information extractor 172 may extract object recognition information and object feature information, and provide the extracted information to the neural network calculator 173.

The neural network calculator 173 may provide the security enhancement module 175 with information such as privacy related information, privacy related object information, and privacy risk information of the content information. The privacy risk information may be expressed as a grade.

The security enhancement module 175 drives a security enhancement program, and may be controlled by the SoC processor 176. When privacy related information is included in the content information inputted by controlling the security enhancement module 175 (S175A), the SoC processor 176 may store the content information in the first region 177RA of the SoC memory 177 (S175B), and when privacy information is not included in the inputted content information (S175A), the SoC processor 176 may store the content information in the second region 177G of the SoC memory 177 (S175C).

In other words, if the privacy information is included in the image information or the recognized object information included in the inputted content information, the SoC processor 176 stores the corresponding content information, the image information, and/or the object information in the access restricted area 177RA of the SoC memory 177.

Figure 6:
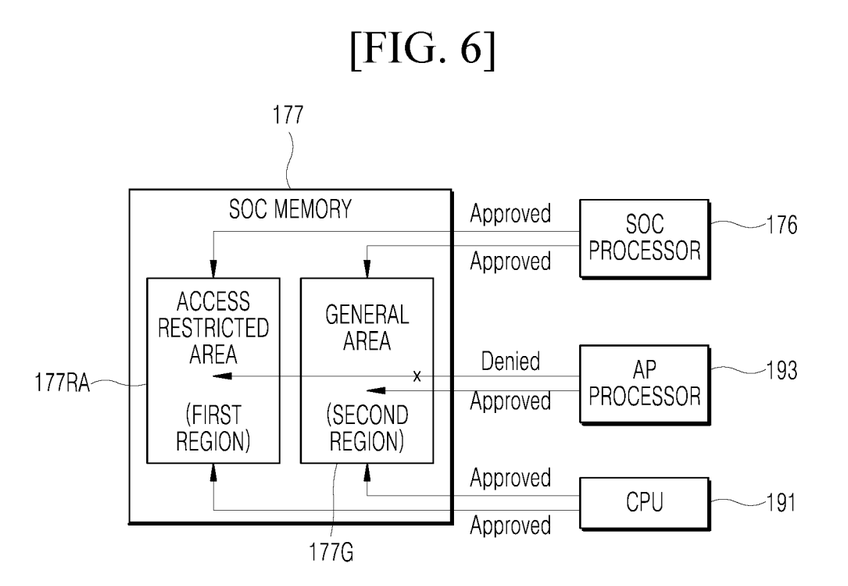
FIG. 6 is a diagram illustrating an access restricted area and a general area of an SoC memory according to an embodiment of the present disclosure.

FIG. 6 is a diagram illustrating a case in which various processors access the SoC memory 177 according to an embodiment of the present disclosure.

The SoC processor 176 may allow access of the CPU 191 and the SoC processor 176 to the first region 177RA, and may deny access of the AP processor 193 to the first region 177RA. In some embodiments, the SoC processor 176 may allow the CPU 191 to access the first region 177RA only in a few cases.

Accordingly, the HW filter 178 may allow access of the SoC processor 176 and the CPU 191 to the first region 177RA, and may deny access of the AP processor 193 to the first region 177RA.

In addition, the HW filter 178 may allow access of the CPU 191, the SoC processor 176, and the AP processor 193 attempting to access the second region 177G.

Figure 7:
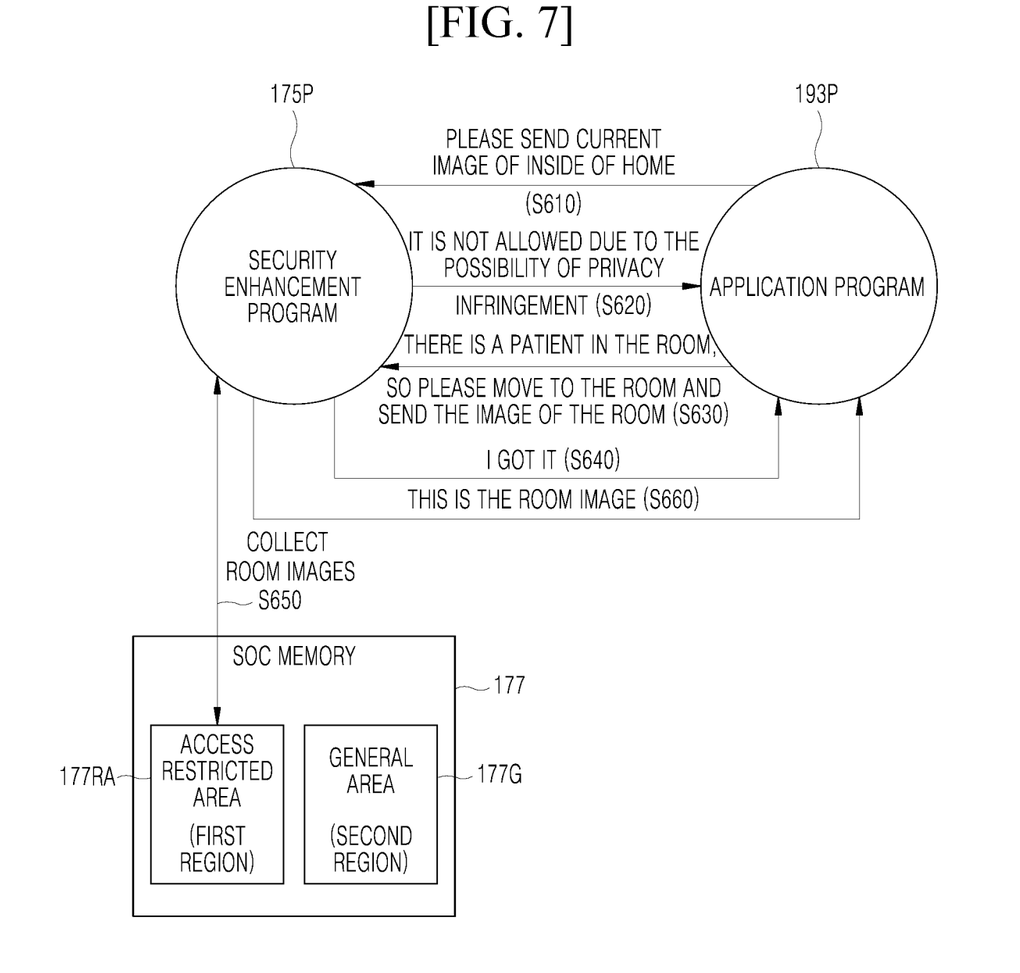
FIG. 7 is a sequence diagram illustrating a process of acquiring information of an access restricted area of an SoC memory by an application program according to an embodiment of the present disclosure.

FIG. 7 illustrates communication between a security enhancement program 175P and an application program 193P according to an embodiment of the present disclosure.

Here, the security enhancement program 175P is a program that has access to the first region of the SoC memory 177, may be driven by the security enhancement module 175, and may be controlled by the SoC processor 176.

The application program 193P may have requested the content information including the privacy information in the first region 177RA from the HW filter 178 and been rejected.

The application program 193P may request privacy information from the security enhancement program 175P.

For example, the application program 193P may transmit a request of "Please send the current video of the inside of the house" to the security enhancement program 175P (S610).

Then, the security enhancement program 175P may reply with "Not allowed due to the possibility of privacy infringement", because the content information is privacy information (S620).

The application program 193P may then transmit, to the security enhancement program 175P, urgent situation information to obtain the corresponding content information. Specifically, the application program 193P may transmit an emergency command, "There is a patient in the room, so please move to the room to send an image of the room" (S630).

The security enhancement program 175P may transmit an acceptance message (S640), and request that the information protection apparatus 100 move to the inside of the room. In this case, the security enhancement program 175P may determine the emergency information based on the learning model 177a of the SoC memory 177. For example, the learning model 177a may determine whether the first region 177RA of the SoC memory 177 is approached in consideration of information such as reliability information of the requesting terminal, emergency information of the request message, and information on whether the information protection apparatus 100 can perform the request message.

The information protection apparatus 100 may store photographed images in the first region 177RA of the SoC memory 177 and collect room images, in real time (S650).

Then, the security enhancement program 175P may transmit the collected room images to the application program 193P.

That is, when a unit without an access right (such as a processor or a peripheral, application program) requests predetermined content information stored in the first region 177RA, the SoC processor 176 may determine whether the requested content information includes privacy information, and based on the determined information may provide, to the unit without an access right, whether the privacy information is included. Here, the unit may be hardware, but in some embodiments, the unit may be a program.

The SoC processor 176 may determine the range of privacy information to be published based on the urgency level, and may set the range of privacy information to be published using the learning model 177a stored in the SoC memory 177.

Figure 8:
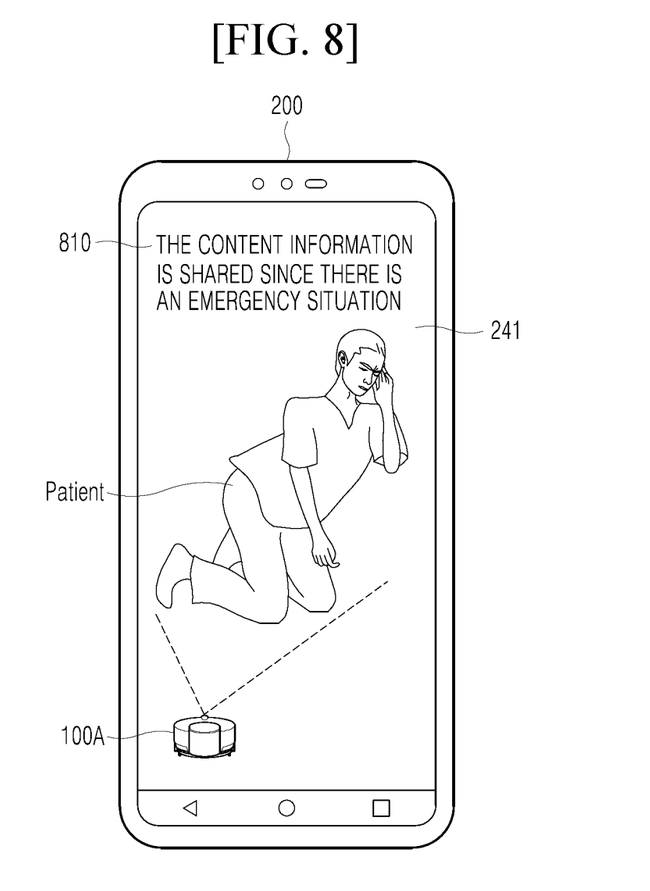
FIG. 8 is a diagram for explaining a situation in which an external mobile terminal acquires information of an apparatus for protecting information according to an embodiment of the present disclosure.

FIG. 8 illustrates a mobile terminal 200 that has received content information from the information protection apparatus 100 according to an embodiment of the present disclosure.

The mobile terminal 200 does not have a right to receive the content information stored in the first region 177RA of the information protection apparatus 100, but may request the content information from the CPU 191 or the SoC processor 176 of the information protection apparatus 100. The information protection apparatus 100 may provide the content information stored in the first region 177RA to the mobile terminal 200 in order to check the status information of the patient based on the calculation result of the learning model 177a of FIG. 7.

The mobile terminal 200 may receive, from the information protection apparatus 100, a sentence 810 of "The content information is shared since there is an emergency situation", and display the sentence on the display 241. The sentence may be displayed on an AR basis.

Figure 9:
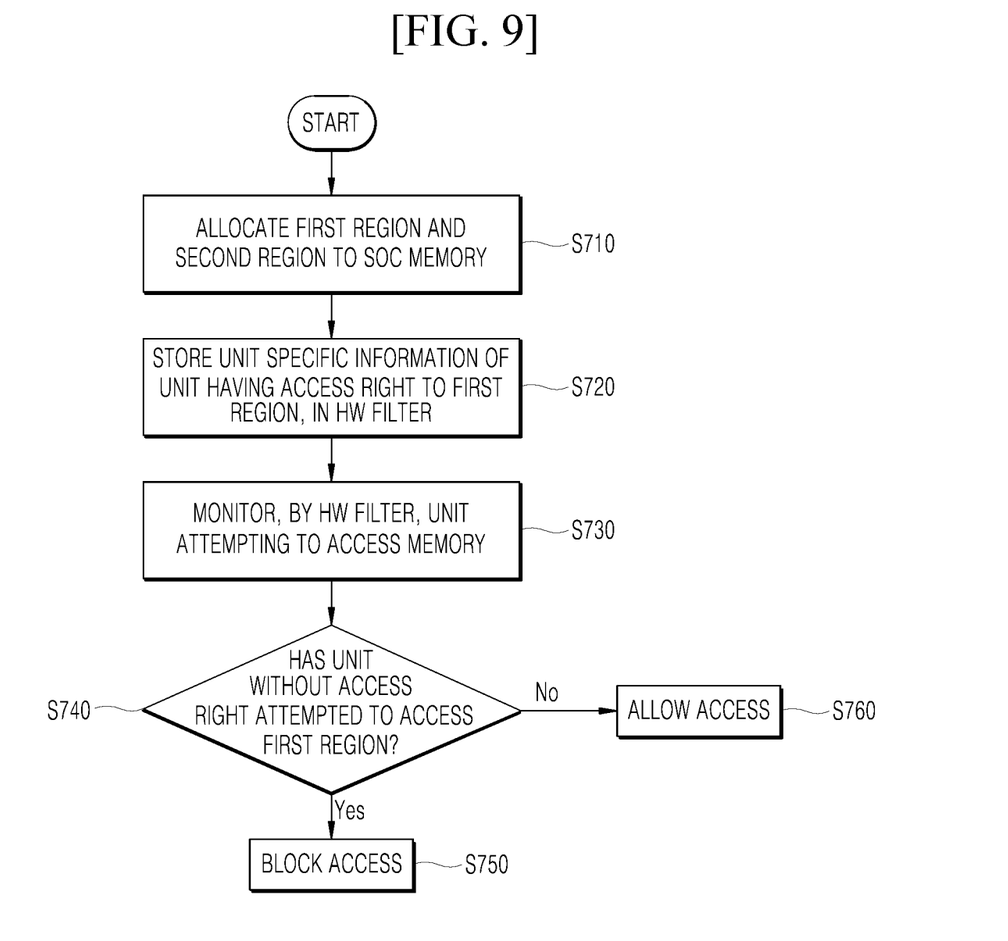
FIG. 9 is a sequence diagram showing a method of driving an apparatus for protecting information according to an embodiment of the present disclosure.

FIG. 9 is a sequence diagram showing a method of driving an information protection apparatus 100 according to an embodiment of the present disclosure.

First, the information protection apparatus 100 allocates, to the SoC memory, a first region accessible to a unit having an access right and a second region without access restriction (S710).

Then, the information protection apparatus 100 stores, in the HW filter, unit specific information of the unit that is allowed to access the first region (S720).

Thereafter, the information protection apparatus 100 monitors one or more units attempting to access the SoC memory through the HW filter (S730).

Then, when a predetermined unit that does not have an access right to the first region attempts to access the first region (S740), the information protection apparatus 100 blocks the access of the predetermined unit (S750).

When a predetermined unit having an access right to the first region attempts to access the first region, the access is allowed (S760).

In the information protection method, when the inputted content information includes privacy information, the content information may be stored in the first region, and when the inputted content information does not include privacy information, the content information may be stored in the second region.

When the inputted content information includes image information, the information protection method may further include recognizing an object from the image information.

In this case, the storing of the content information in the first region may include storing the content information in the first region when the privacy information is included in the image information or the recognized object.

The recognizing an object from the image information may include extracting feature information from the image information or the recognized object on the basis of vision recognition, and may include calculating whether the image information or the recognized object includes privacy information using the extracted feature information as an input, based on a previously stored learning model.

When a unit that does not have an access right to the first region after step S750 requests predetermined content information stored in the first region, the information protection method may include determining whether the requested content information includes privacy information, and providing information on whether the privacy information is included to the unit based on the determined information.

Finally, when transmitting the content information included in the first region to the outside of the SoC, the information protection method may further include encrypting the content information to be transmitted.

The encryption method may perform video encoding and may include an encryption algorithm (for example, a key algorithm).

Since the information protection apparatus according to various embodiments of the present disclosure performs a privacy-related operation inside the SoC and does not specifically process (blur or mask) the image, the processed image does not need to be calculated in a secure area by using an algorithm such as a CNN or a DNN (for example, a security enhancement program (such as 175P of FIG. 7, Secure Enclave, or TEE), thereby enhancing the device efficiency.

The present disclosure described above can be embodied as computer-readable codes on a medium on which a program is recorded. The computer readable medium includes all types of recording devices in which data readable by a computer system readable can be stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like. In addition, the computer may include the processor 190 of the information protection apparatus 100 or the SoC processor 176 of the SoC 170.

Although specific embodiments of the present disclosure have been shown and described above, the present disclosure is not limited to the specific embodiments described, and those skilled in the art will appreciate that various modification and changes may be made therein, without departing from the scope and spirit of the present disclosure. Therefore, the scope of the present disclosure should be defined not by the above-described embodiments but by the technical idea defined in the following claims.

What is claimed is:

1. An apparatus for protecting information, the apparatus comprising:
    a storage configured to store data;
    a system on a chip (SoC);
    a system on a chip (SoC) memory which is disposed in the SoC and includes a first region accessible only by a unit having an access right and a second region without access restriction;
    a hardware (HW) filter configured to monitor at least one unit attempting to access the SoC memory and, when a unit without an access right attempts to access the first region, block access of the unit without the access right; and
    a processor configured to store, in a filter storage of the HW filter, unit specific information of the unit having the access right to the first region,
    wherein the HW filter is configured to determine a unit that has access to the first region based on the unit specific information stored in the filter storage,
    wherein the processor is configured to adjust a size of the first region and a size of the second region based on a degree of use of the first region and the second region,
    wherein the storage is disposed outside the SoC,
    wherein, when the unit without the access right requests predetermined content information stored in the first region, the processor is configured to determine whether the requested content information includes privacy information, and provide, to the unit without the access right, information on whether the privacy information is included, based on information on the determination by the processor,
    wherein the apparatus further comprises an object recognizer configured to recognize an object from image information, when the content information includes the image information,
    wherein, when privacy information is included in the image information or the recognized object, the processor is configured to store the content information in the first region,
    wherein the object recognizer comprises:
        a vision information extractor configured to extract feature information from the image information or the recognized object based on vision recognition; and
        a neural network calculator configured to determine whether the image information or the recognized object includes the privacy information, by using the extracted feature information as an input, based on a previously stored learning model, wherein the learning model is stored in the SoC memory,
    wherein the learning model is configured to output information on whether privacy information is included in the predetermined content information based on the extracted feature information of the recognized object, and
    wherein the extracted feature information comprises appearance information, dimension information, time information, place information and movement information of the recognized object.

2. The apparatus of claim 1, wherein the HW filter is disposed on a system bus between at least one unit attempting a read or write operation in the SoC memory, and the SoC memory.

3. The apparatus of claim 1, wherein, when a predetermined unit attempts to access the second region, the HW filter allows an operation of the predetermined unit.

4. The apparatus of claim 3, wherein:
    when privacy information is included in inputted content information, the processor is configured to store the content information in the first region of the SoC memory, and
    when privacy information is not included in the inputted content information, the processor is configured to store the content information in the second region of the SoC memory.

5. The apparatus of claim 1, further comprising:
    a security enhancement module configured to encrypt content information to be transmitted, when content information included in the first region is transmitted to an outside of the apparatus or the SoC.

6. The apparatus of claim 1, wherein the HW filter and the processor are disposed in the SoC.

* * * * *